Nov. 14, 1933.  P. LANHAM  1,935,508
MECHANICAL MANOGRAPH
Filed June 18, 1931
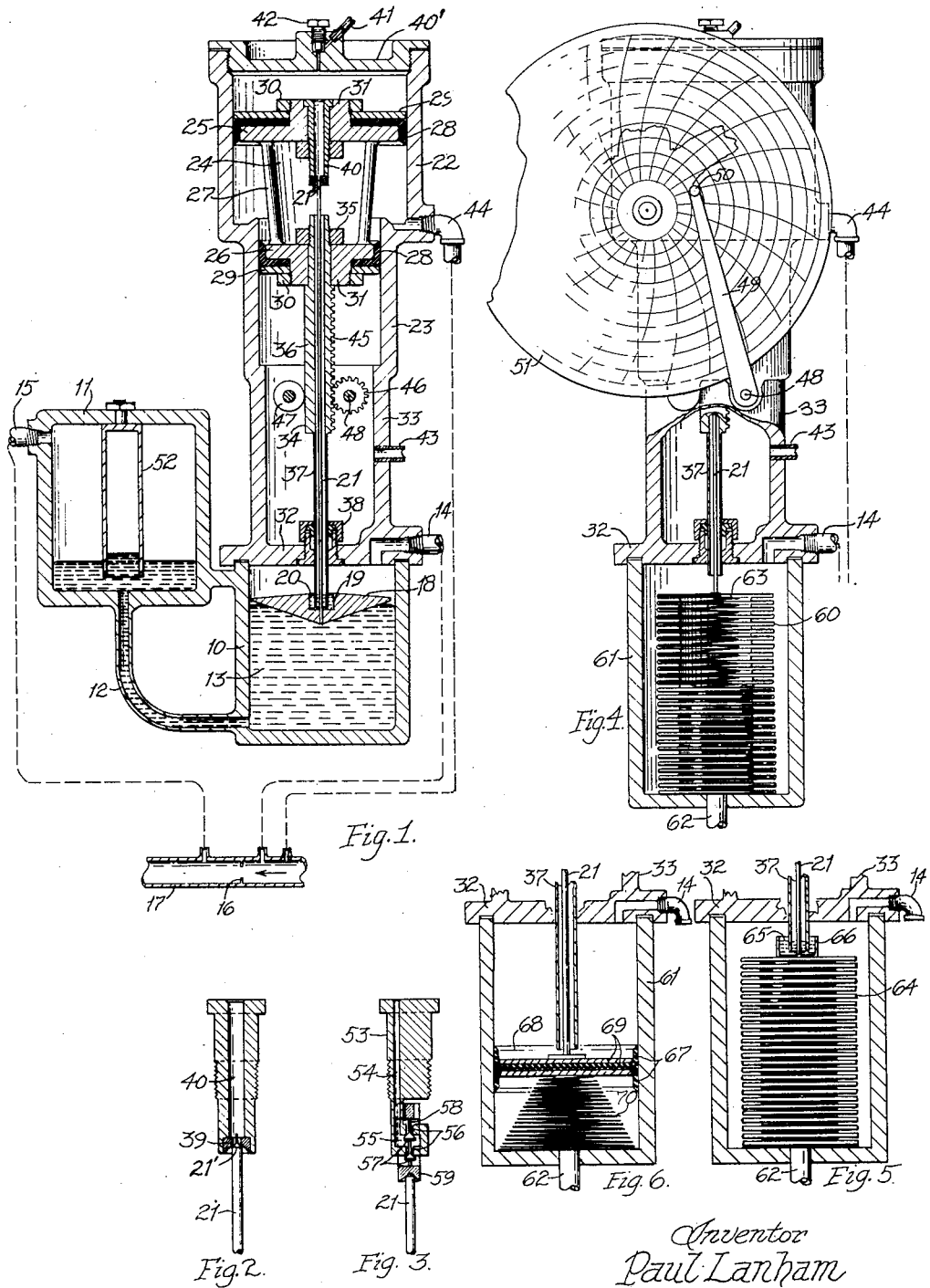
Inventor
Paul Lanham
per James B. Lewis
Attorney Patented Nov. 14, 1933

1,935,508

UNITED STATES PATENT OFFICE 1,935,508

MECHANICAL MANOGRAPH

Paul Lanham, Lanham, Md.

Application June 18, 1931. Serial No. 545,317

20 Claims. (Cl. 234—34)

The present invention relates in general to a measuring instrument for recording or indicating variations in a quantity or value to be measured, such as the volume or rate of flow of a fluid.

The invention is particularly adapted for measuring the flow of fluid and pressure and while these applications are described in detail in the specification, it is to be understood that they are only illustrative and not limitative as the invention is susceptible of variations and other adaptations.

One object of the invention is to provide a simple, practical, and accurate device of the class described.

Another object is to secure accuracy both in recording and registering.

A further object is to provide a device in which accurate records or indications are obtained even where the pressure variations are extremely small.

A still further object is to provide a recording mechanism operated by an extraneous power under the control of a responsive member which is free to respond to its motivating force and which is not required to exert any appreciable force in controlling the extraneous power.

An important object of the invention is to provide a recording mechanism operated by a motor controlled in accordance with the position of a sensitive responsive member which is free to respond to its motivating force and the sensitivity of which is not impaired during the control operation.

A further important object of the invention is to provide a recording meter operable by a fluid motor that may be operated by the pressure of the metered fluid and which is controlled in its operation by a member positioned in accordance with the flow of the fluid.

A still further object of the invention is to provide a substantially frictionless arrangement for transmitting the movements of the responsive member to a point remote from the pressure chamber in which the responsive member is located, which permits freedom of movement of the member, and which is adapted to both high and low pressure ranges.

An important feature of the device is that in its operation forces of great magnitude are made effective to operate the recording or other mechanism under the exact and precise control of a responsive medium and that by the use of a piston having larger effective areas these forces may be increased to any desired value with no reduction in the accurate and/or sensitive response of the responsive medium.

The foregoing and various other objects are obtained by the device illustrated in the accompanying drawing and described below. It is to be understood that the invention is not limited to the specific forms thereof shown and described.

In the drawing:

Fig. 1 is a vertical sectional view of one embodiment of the invention as applied to the measurement of the flow of fluid thru a conduit, the connections to the conduit being indicated diagrammatically.

Fig. 2 is an enlarged sectional view of the variable orifice of the fluid motor.

Fig. 2 illustrates a balanced valve mechanism which may be substituted for the valve arrangement shown in Fig. 2.

Fig. 4 is a front view partly in elevation and partly in section of a different embodiment of the invention.

Figs. 5 and 6 illustrate further adaptations of the invention.

Referring more specifically to the exemplary embodiment of the invention illustrated in Fig. 1, there is shown a device containing a movable member responsive to and controlled by the fluid flowing thru a conduit, the quantity of which is to be measured.

The particular device shown comprises a high pressure chamber 10 and a low pressure chamber 11 interconnected by a tube 12, which affords a passageway between the two chambers for the movement of the responsive medium 13, which may be a liquid, preferably mercury, from one to the other of said chambers in response to the differential pressures exerted thereon in the respective chambers.

The pressures are transmitted to the chambers 10 and 11 thru leading and trailing pipes 14 and 15 respectively, which extend to the two sides of a suitable pressure differential creating device 16 located in a conduit 17 thru which the fluid to be measured flows. As an example, a pressure difference creating device in the form of an orifice is shown, and the connections to it are illustrated diagrammatically.

The movement of the mercury to and from the high and low pressure chambers causes changes in level which may be transmitted to and utilized to effect operation of a recording or other mechanism by suitable means which preferably comprises a float 18 located in and subject to the flotative action of the mercury in the high pressure chamber. The top of the float is slightly declined downwardly toward its periphery to preclude the accumulation of mercury or other substance thereon, which might change its weight and therefore its position relative to the surface of the liquid upon which it floats, and is provided with a well 19 containing a suitable sealing liquid 20, such as mercury, the function of which will be later described. A control rod 21 carried by the float, extends from the pressure chamber and controls the operation of a power device which, in the present instance, operates the recording pen of a registering device in accordance with the varying movements of the responsive member.

Power for operating the recording or other mechanism may be furnished by a motor suitable for such operation and adapted to the particular power available at the point of installation. The motor illustrated is of the fluid pressure type and is preferred because it may be operated by the pressure of the fluid being measured. Where the motor utilizes a different source of energy from that of the metered fluid, the presence of that energy at the point of installation of the device is a necessary pre-requisite for the installation. However, where the motor is of the fluid operative type the pressure of the measured fluid may be utilized for operating the motor and thus the device may be installed wherever it is desired to measure the flow or pressure of a fluid.

The motor illustrated is of the differential pressure type and preferably comprises a cylinder having a bore 22 of larger diameter and a bore 23 of smaller diameter. Reciprocating within the cylinder is a piston 24 comprising heads 25 and 26 conforming in size and shape to the larger and smaller bores 22 and 23, respectively, and connected by a member 27 so as to move in unison. The piston heads are shaped to receive a packing which contacts with and conforms to the cylinder wall to form therewith a fluid tight joint and which, as shown, may comprise leather cups 28, the skirts or walls of which fit the walls of the cylinder and are forced thereagainst by the pressure exerted thereon. The leather cups are retained in place on the respective pistons by retainer or backing plates 29 fixedly secured to the piston head by nuts 30 screwed upon threaded bosses 31 on the piston.

For convenience the motor may be mounted on the cover 32 of the float chamber and when desired, the cylinder may be provided with an extension wall 33 connecting with the cover 32 of the float chamber. The component parts of the meter and motor assembly may be separable at convenient points or they may be made integral as shown.

The lower piston head is bored for the reception of a member 34, which is secured thereto by a clamping nut 35. This member preferably includes a hollow portion 36 and a sleeve or tubular portion 37 which extends thru a packing gland 38 in the cover 32 and has its lower end immersed in the sealing liquid 20 in the well 19 of float 18. This construction permits an efficient transmission of the movement of the float to the exterior of the float chamber without interfering with or restraining such movement and without loss of pressure from the float chamber. Inside the member and in spaced relation thereto is the control rod 21 which is associated with float 18. The rod 21 extends thru the member and carries a valve stem 21' cooperating with valve seat 39 carried by hollow member 40 secured to the larger piston head 24. The valve stem and seat may be tapered and together form a variable orifice for the flow of fluid from the chamber between the two piston heads to the chamber above the larger piston head.

Cover 40' for the end of the cylinder adjacent the larger piston head is provided with an opening 41, the effective size of which may be varied by valve 42 and the end of the cylinder adjacent the smaller piston head is exposed to pressure thru an opening 43 in the extension 33. The openings 41 and 43 communicate with the same pressure source which is preferably, though not necessarily, the atmosphere.

Communicating with the cylinder between the piston heads and preferably at the juncture of the larger and smaller bores is a pressure pipe 44 which supplies the motive fluid to the motor. Where the fluid to be measured is used to operate the motor, the pipe 44 may be and preferably connects directly with the conduit, thru which the fluid to be measured flows, independently of the leading pipe 14, as indicated diagrammatically in Fig. 1, but it may be connected to the leading pipe adjacent to the conduit or at some other point thereon.

It will be evident from the foregoing that the piston is subjected to a plurality of pressures, that is, the chamber between the piston heads is subjected to a high pressure admitted thru pipe 44. The lower face of the smaller piston head is subjected to atmospheric pressure thru opening 43 and the upper face of the larger piston head is subjected to an intermediate pressure which is less than the high pressure and greater than atmospheric pressure. The forces produced by these pressures are in equilibrium when the force produced by the difference between the high and intermediate pressures acting on the larger piston head balances the force due to the high pressure minus the atmospheric pressure acting on the smaller piston head. This equilibrium of forces obtains when the flow of fluid thru the variable orifice equals the flow thru the valve 42, that is, the piston takes up a position such that the effective orifice between the valve stem 21' and its seat 39 passes the same volume of fluid per unit of time into the pressure chamber above the larger piston head as escapes from that chamber to the atmosphere thru opening 41 during the same unit of time.

From the foregoing it will be seen that the piston is operated by powerful forces, the magnitude of which may be conveniently varied as by changing the size and ratio of the piston areas to adapt the device to different installation requirements. In view of the power developed the device has a wide range of usefulness, particularly for operating mechanism for recording, regulating, or controlling fluid flows, pressures, and the like, and various means may be employed for transmitting the movements of the piston to the mechanisms to be operated.

One type of means, which has proved practical for operating a recording mechanism, comprises a rack 45, associated with the member 34, a pinion 46 meshing with the rack, which is maintained in proper relation therewith by the guide 47, and a shaft 48 for supporting and transmitting the rotations of the pinion to a desired position. In the illustration the shaft operates a pen or stylus arm 49 provided with a marking element 50 which cooperates with a chart 51 driven by a clock mechanism, not shown, as is well understood in the art. By this mechanism movements of the piston, which follows the movements of the responsive member as it moves in response to the variations in flow, are transmitted to the pen arm and the stylus graphically records these movements on the chart.

The operation is as follows: Assuming that the forces acting on the piston are in equilibrium under the flow condition obtaining, upon an increase in flow, the differential pressure acting on the responsive medium causes the mercury in chamber 10 to recede to a lower level, thereby lowering the float and the valve stem 21' with it. This movement of the valve away from the valve seat opens the variable orifice wider than its normal opening, causing a larger flow into the pressure chamber above the larger piston head than flows thru the valve 42. This increased flow thru the variable orifice builds up the pressure in the chamber above the larger piston head above the normal pressure therein. This results in a decreased pressure difference acting on the large piston head leaving the force acting on the smaller piston head greater than that on the larger thereby causing the piston to move down, thus bringing the valve seat 39, carried by the piston, closer to the valve stem 21'. When the piston has moved sufficiently to reduce the opening thru the variable orifice to such an extent that the flow therethru is equal to the flow thru the valve 42, the forces acting on the piston are restored to balanced relation and the piston comes to rest at a new position corresponding to the then position of the float.

Upon a decrease in flow, the differential pressure causes the mercury to rise in the pressure chamber 10 thereby raising the float and the valve stem with it. This movement of the valve stem toward the valve seat decreases the effective opening of the variable orifice, or closes it entirely, causing a smaller flow into the pressure chamber above the larger piston head than flows thru the valve 42. This smaller flow thru the variable orifice results in an increased pressure difference acting on the larger piston head making the forces acting thereon greater than those on the smaller piston head thereby causing the piston to move upwardly, thus retracting the valve seat away from the valve stem to increase the effective size of the variable orifice to such an extent that the flow therethru equals the flow thru the valve 42, whereupon the forces acting on the piston are brought into equilibrium and movement of the piston ceases.

During these operations it will be seen that the piston movement follows very accurately the movement of the mercury in chamber 10 as it responds to variations in the flow, and that the float, due to the fact that the valve stem carried thereby is not secured to the piston, is free to move in response to the rise and fall of the mercury in the float chamber and that none of the energy of the float is dissipated thru friction nor is the movement of the float restrained in any manner whatsoever. This is an important feature since the sensitivity and therefore the accuracy of the instrument is greatly enhanced by the unrestricted movement of the float in response to its motivating forces.

As is well known the pressure difference creating device of a flow meter creates a pressure difference which is proportional to the square of the flow. Since this pressure difference causes a movement of the float proportional to the square of the flow the movement of the piston and the pen arm is proportional to the square of the flow. However, if it is desired that the pen arm movement vary directly with the flow, such movement may be accomplished by the interposition of suitable corrective means between the pen arm and the motor.

Inter-communication between the high pressure float chamber and the high pressure chamber between the piston heads, thru the hollow member 34, may be prevented by immersing the lower end of the sleeve 37 in the mercury 20 carried in the well 19 of the float, or if desired, the rod 21 may have a fairly close yet free fit with the member 34, thus permitting slow leakage therearound but which is ineffective to disturb the pressures in either chamber. These arrangements preclude variations in pressure, in the high pressure chamber between the piston heads from manifesting themselves in the high pressure float chamber, thus enhancing the accuracy of the device.

The effective pressure area of the bottom of the float is greater than the effective pressure area of the top of the float by an amount equal to the cross-sectional area of the rod 21 and since the end of valve stem 21', associated with the rod 21, is subjected to a variable pressure different from that in the float chamber 10, the buoyancy of the float is varied in accordance with variations in these pressures. While these variations may be small they may affect the accuracy of the device and to prevent this possibility a compensating device is provided.

One type of such device comprises a hollow member 52, containing a volume of gas, preferably air, projecting into and sealed by the liquid in chamber 11 and arranged so that when the pressure in the chamber increases the entrapped gas in the member is compressed and the mercury rises therein an amount sufficient to lower the mercury in chambers 10 and 11 to counteract the increased buoyancy of the float due to the variations of pressure acting on the valve 21'. In this manner the level of the mercury is varied sufficiently to counteract the variations in buoyant effect and the float is accurately positioned in accordance with the differential pressure only so that the accuracy of the float position is maintained irrespective of the pressure variations.

Different types of variable orifice means may be used for controlling the flow of pressure fluid into the pressure chamber above the larger piston head. In Fig. 3 a balanced type of valve is illustrated and which comprises a member 53 to be mounted in the piston head 24 and having an outlet passage 54 communicating with the chamber 55 provided with aligned valve seats 56 in the top and bottom walls thereof and valves 57 cooperating with the seats to vary the effective opening therethrough. The valves 57 may be mounted on the stem 58 carried by yoke 59 coacting with the control rod 21 which positions the valves relative to their seats to vary the flow therethrough, the flow pressure against the valve balances out the velocity effects thereon in a well-known manner and the compensator 52 is not necessary with this form of control valve.

The invention is well adapted to the measurement of pressures as well as differential pressures and the pressure responsive medium may take various forms such, for example, as diaphragms, pistons, and the like. In Fig. 4 the responsive medium comprises a diaphragm or bellows 60 dividing the pressure chamber 61 into two compartments, one of which compartments is subjected to pressure admitted thru the connection 62 while the other compartment is subjected to pressure admitted thru connection 14. When it is desired to measure a pressure the connection 14 may be connected with that pressure source while the connection 62 opens to the atmosphere and when a differential pressure is measured the connections 62 and 14 may be connected to those pressure sources as illustrated in Fig. 1.

In Fig. 4 the control rod 21 is associated with the diaphragm and extends thru the hollow member 33 to operate the piston in the same manner as described in connection with Fig. 1. Since the piston follows the movement of the diaphragm the pen arm movements will be directly proportional to the diaphragm movements and any variations thereof due to change in pressure exerted thereon will be indicated and recorded on the chart.

Where the pressure or pressure differential is high, movement of the responsive medium may be opposed by a spring 63 calibrated for a certain pressure range and with this type of apparatus, a change from one pressure range to another may be accomplished by substituting the proper spring for the range desired.

In the form illustrated in Fig. 5 the pressure chamber 61 is divided into two compartments by a movable member 64 consisting of a sylphon or bellows which expands and contracts in response to the pressures within and without the same and where the resiliency of the member is inadequate for the pressure measured the member may be supplemented by a spring similar to that of Fig. 4. In this embodiment the lower end of the sleeve 37 is immersed in a sealing liquid 65 in receptacle 66 associated with the movable member 64 to prevent intercommunication between the pressure chamber 61 and the pressure chamber within the piston 24.

In the modification shown in Fig. 6 the pressure chamber 61 contains a movable member 67 in the form of a piston which divides the chamber into two separate pressure chambers. The piston comprises a packing 68 in the form of a leather cup, engaging the interior walls of the chamber and plates 69 on either side of the packing for retaining it in position. Movement of the piston in one direction is resisted by a spring 70 which may be calibrated for certain pressure ranges and which may be replaced by other springs calibrated for different ranges of pressure.

It is to be understood that the invention is not limited by the exact embodiments shown, which are merely by way of illustration and not limitation, as various and other forms of the device will, of course, be apparent to those skilled in the art without departure from the spirit of the invention or the scope of the claims.

I claim:

1. A meter comprising a recorder having a movable stylus, a prime moving device for operating said recorder, a member positionable in accordance with variations in the quantity to be measured and means operated by said member for positioning said prime moving device and said stylus in accordance with the position of said member.

2. A meter comprising a recorder having a movable arm, a reversible fluid motor for operating said arm, a member positionable in accordance with the value to be measured, and means actuated by said member for controlling the operation of said motor so as to effect motion of said motor equal to the motion of the member.

3. A meter comprising a recorder having a marking arm, a fluid motor including a movable member for operating the recorder, a fluid column variable with the quantity to be measured, a float responsive to movement of the column and means associated with said float for controlling the operation of said motor so as to effect motion of said motor equal to the motion of the member.

4. A meter having in combination a member responsive to variations in the value of the quantity to be measured, a fluid motor including a piston operable by a plurality of pressures in balanced relation when said motor assumes a position corresponding to that of the member, means actuated by said member for unbalancing the pressures acting on said piston whereby the piston follows the member until an equilibrium of force acting thereon is again established and a recording means operated by said piston.

5. In a measuring instrument the combination of a fluid motor having a movable piston operated by differential pressures, a member movable in response to variations in the value of a quantity to be measured and effecting movement of said piston identical to its own, and a recorder operated by said piston in accordance with the position thereof as determined by the responsive member.

6. In a measuring instrument the combination of a fluid motor having a differential piston therein, a member responsive to variations in the value to be measured and controlling the pressures acting on said piston whereby the position of the piston is made to follow the position of the movable member and a registering mechanism connected with said piston and operable thereby.

7. A meter having in combination a fluid motor including a movable member operated by a plurality of pressures, a responsive member whose position varies with changes in the value to be measured for controlling the pressures acting on said piston whereby the position of the piston is made to parallel that of said responsive member, a registering device and operating means between said piston and register for operating the latter.

8. An instrument having in combination a fluid pressure chamber and movable means in said chamber acted upon by fluid pressures therein, said means dividing said chamber into two pressure compartments, means for admitting fluid pressure into one of said compartments, a variable orifice connecting the latter with the second compartment, a fixed orifice in the second compartment, a member responsive to variations in the value to be measured for controlling the effective area of said variable orifice thereby varying the pressures acting on said piston and a registering means operated by said piston as it moves in response to the variable pressures exerted thereon.

9. An instrument having in combination a motive device including a member operable by a plurality of forces, a fluid column variable with the forces to be measured, float means operated by said column for controlling the forces acting on said movable member to vary the position thereof to parallel the variations in the fluid column and a registering device operated by said movable member.

10. A device of the class described comprising a fluid column variable with the value to be measured, a motive device including a cylinder and a piston therein, means for admitting pressure to said piston to operate the same, a float on said fluid column and movable therewith, means controlled by said float for controlling the pressures acting on said piston for causing said piston to undergo the same movement as the fluid column and a registering device operated by said piston for indicating variations in the value to be measured.

11. An instrument of the type described comprising in combination a column of liquid of variable height, a movable member operated by a plurality of forces, registering means associated with said member, a float on said liquid and means operated by the float for varying said forces to effect movement of the member parallel to that of the float.

12. A meter having in combination a fluid column variable in accordance with the forces to be measured, a float operable by said column, a fluid motor including a piston positionable by a plurality of differential pressures, and means controlled by said float to vary said differential pressures for positioning of the piston a fixed distance from the float and recording means operated by said piston as it follows the movements of said float.

13. A recorder having in combination, a cylinder open at one end and having a restricted opening in its other end, said two openings communicating with like pressures, a piston in said cylinder dividing said cylinder into an intermediate and two exterior chambers, means for admitting a pressure fluid to said intermediate chamber and means for controlling the flow of the pressure fluid from the latter to the exterior chamber having a restricted outlet, a member movable in response to variations in the value to be measured for controlling said last named means to coordinate the movement of the piston with that of the member, and a recording stylus operated by said piston.

14. A meter having in combination a cylinder open at one end to the atmosphere and having a restricted opening at its other end leading to the atmosphere, a piston in said cylinder dividing the same into an intermediate and two exterior pressure chambers, means for admitting a pressure fluid into the intermediate chamber, a variable orifice between said intermediate chamber and the chamber having the restricted opening for controlling the flow of the pressure fluid into said latter chamber, a fluid column variable with the forces to be measured, a float actuated by said column, and means controlled by said float for varying the effective opening of said variable orifice to correlate the travel of the piston with that of the float and a recorder operated by said piston.

15. A meter having in combination a manometer having a responsive liquid therein subjected to the pressures to be measured, a cylinder mounted in fixed position relative to said manometer and having a piston therein dividing the same into a plurality of pressure chambers, means for admitting pressure fluid into the respective chambers, the forces exerted by said fluid on the piston being normally in equilibrium, a float on said responsive liquid positionable in accordance with variations of the height thereof, means controlled by the float for controlling the pressure fluid on said piston to cause the same to move until said forces are again in equilibrium, and a recorder controlled by said piston.

16. A meter having in combination a manometer containing a responsive fluid movable in accordance with variations in the quantity to be measured, a cylinder having bores of different diameter and open to the atmosphere at one end and having a restricted communication with the atmosphere at its other end, pistons in the bores connected to operate in unison and dividing the cylinder into a plurality of compartments, means for admitting fluid under pressure into the pressure chamber intermediate said pistons, the piston adjacent the restricted outlet having a valve seat therein, a float on said responsive liquid having a valve stem cooperating with said valve seat to vary the effective opening therethrough, the arrangement being such that the forces exerted on the pistons are in equilibrium when the flow of the pressure fluid thru the variable orifice equals the flow thru the restricted outlet, and a recorder operated by said piston as it moves in response to the unbalancing of the forces thereon due to variations of the valve stem relative to the valve seat.

17. A device having in combination a registering element to be operated, a fluid motor for operating said element and comprising a piston operable by a plurality of pressures which are in equilibrium when the piston is at rest, control means associated with said piston for controlling the action of said pressures thereon, a movable member responsive to the quantity to be measured having connecting means cooperating with said control means to unbalance said pressures for causing said piston to move, said piston, during movement thereof, actuating said control means to restore said pressures to equilibrium, thereby coordinating the movement of the piston with that of the responsive member.

18. A meter having in combination a confined liquid column, the height of which varies in response to variations in a value to be measured, a float on said liquid movable therewith and provided with a well, a hollow member extending into said well, a motor for operating said member, a rod carried by said float extending thru and in spaced relation to said tubular member for controlling operation of said motor, a sealing liquid in said well for sealing that end of the hollow member extending into said well, and a recording mechanism operated by said motor in accordance with variations in the quantity to be measured.

19. A fluid meter comprising in combination an indicating member, a pressure responsive actuating member therefor subject to a plurality of forces normally in equilibrium, a responsive medium positionable in accordance with variations in the value to be measured, and means actuated by said medium for unbalancing said forces to effect travel of the actuating member equal to the movement of the medium as it responds to variations in the value to be measured.

20. A fluid meter comprising in combination a pressure chamber subjected to a pressure proportional to the quantity to be measured, a movable member in said chamber subject to the pressure therein and to a variable pressure which imparts to said member an artificial movement and automatic means for compensating for the effects of the variable pressure on said member to eliminate the artificial movement thereof.

PAUL LANHAM.